Patented Sept. 29, 1942

2,297,502

UNITED STATES PATENT OFFICE 2,297,502

TREATMENT OF DRIED PEAS

Willi Rudolph, Karlsruhe, Baden, Germany; vested in the Alien Property Custodian No Drawing. Application September 12, 1940, Serial No. 356,524. In Germany October 7, 1939

5 Claims. (Cl. 99—100)

This invention relates to a method of treating dried peas to improve foodstuffs made therefrom.

In the commercial manufacture of food preparations, as pea soup preserves, seasoned pea meal marketed in parchment rolls, etc., the dried peas, such as the ordinary yellow peas, are subjected to steam to shorten the time required for cooking the peas and also to remove the bitter principle therefrom to thereby assure good taste of the products made ready for kitchen use. To speed up this disintegrating process, an agent is employed for reducing the time of cooking by about fifty per cent and improving the taste and color of the peas. This agent has hitherto exclusively consisted of a mixture of phosphates and sodium carbonate. However, the said mixture caused soda to enter the peas and remain therein which disadvantageously affected the peas.

This drawback can be overcome according to the invention by employing alkali citrates, particularly neutral sodium citrate as accelerating agents. These substances are free from alkaline matter, and the basic citric acid is a natural constituent of some foods and as such has been found to be particularly wholesome and beneficial. A further advantage is that citrate need be added only to the extent of one-half of the usual quantities heretofore used for the speeding up of the disintegrating process without impairing the effect.

The following examples have yielded good results:

Example 1

1 kg. of halved yellow peas is cooked in water with the addition of 1 g. neutral sodium citrate. After the mixture has been cooked for one hour, the peas will be done and will possess the desired color and also a pure taste, whereas peas cooked without the addition of citrate require two hours before they are done and do not have similar advantageous features as to color and taste.

Example 2

1,000 kg. halved yellow peas are thoroughly mixed with a solution of 1 kg. neutral sodium citrate in 2 liters of water in a rotary roasting drum, whereupon the mixture is subjected to steam for two and one-half hours at a pressure of 2.5 to 3 atmospheres above atmospheric pressure. The peas are then removed from the drum while they are hot and are then cooled in an air current for one and one-half hours. The cooled material is ground to a fine meal.

I claim:

1. A method of treating dried peas, consisting in subjecting the peas to be treated to a cooking process and adding alkali citrates to said peas to accelerate disintegration thereof.

2. A method of treating dried peas, consisting in subjecting the peas to be treated to steam and adding alkali citrates to said peas to accelerate disintegration thereof.

3. A method of treating dried peas, which comprises the steps of adding neutral sodium citrate to the peas to be treated, and cooking this mixture.

4. A method of treating dried peas, which comprises the steps of adding water and an alkali citrate to the peas to be treated, and cooking the mixture.

5. A method of treating dried peas, which comprises the steps of adding neutral sodium citrate to the peas to be treated, and subjecting the mixture to steam at a pressure of 2.5 to 3 atmospheres above the atmospheric pressure.

WILLI RUDOLPH.